(12) United States Patent
James

(10) Patent No.: US 8,530,541 B2
(45) Date of Patent: Sep. 10, 2013

(54) CEMENT COMPOSITIONS INCLUDING POLYMER PARTICLES

(75) Inventor: Simon James, Le Plessis-Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 99 days.

(21) Appl. No.: 12/993,578

(22) PCT Filed: May 19, 2009

(86) PCT No.: PCT/EP2009/003696
§ 371 (c)(1),
(2), (4) Date: Feb. 16, 2011

(87) PCT Pub. No.: WO2009/143998
PCT Pub. Date: Dec. 3, 2009

(65) Prior Publication Data
US 2011/0136943 A1 Jun. 9, 2011

(30) Foreign Application Priority Data
May 27, 2008 (EP) .................................... 08157025

(51) Int. Cl.
*C09K 8/04* (2006.01)
*C09K 8/24* (2006.01)
*C09K 8/42* (2006.01)

(52) U.S. Cl.
USPC ........ 523/130; 524/2; 524/5; 524/8; 524/543; 166/293

(58) Field of Classification Search
USPC ............. 106/789; 524/5, 543, 2, 8; 166/293; 523/130
See application file for complete search history.

(56) References Cited

U.S. PATENT DOCUMENTS

| | | | |
|---|---|---|---|
| 4,251,576 A * | 2/1981 | Osborn et al. ................ | 428/331 |
| 5,275,655 A | 1/1994 | Grunau et al. | |
| 5,779,787 A | 7/1998 | Brothers et al. | |
| 5,800,910 A * | 9/1998 | Harke et al. .................. | 428/212 |
| 6,059,034 A | 5/2000 | Rickards et al. | |
| 6,406,789 B1 | 6/2002 | McDaniel et al. | |
| 6,632,527 B1 | 10/2003 | McDaniel et al. | |
| 6,907,929 B2 | 6/2005 | Leroy-Delage et al. | |
| 7,255,738 B2 | 8/2007 | Semmens | |
| 2004/0077761 A1 * | 4/2004 | Pavez Aranguiz ............ | 524/423 |
| 2005/0258546 A1 | 11/2005 | Leclercq et al. | |
| 2006/0004126 A1 | 1/2006 | Park et al. | |
| 2006/0258546 A1 | 11/2006 | Brannon | |
| 2007/0022915 A1 * | 2/2007 | Drochon et al. .............. | 106/789 |
| 2007/0023194 A1 * | 2/2007 | Lustgarten ........................ | 168/4 |
| 2007/0151484 A1 | 7/2007 | Reddy | |
| 2007/0155890 A1 | 7/2007 | Chen | |
| 2007/0209795 A1 | 9/2007 | Gupta | |
| 2011/0112211 A1 * | 5/2011 | Audibert et al. .............. | 523/130 |

FOREIGN PATENT DOCUMENTS

| | | | |
|---|---|---|---|
| CA | 1085531 | | 9/1980 |
| EP | 0621247 | | 7/1999 |
| EP | 2113546 | * | 4/2009 |
| WO | 2004/007867 | | 1/2004 |
| WO | 2004007867 | | 4/2004 |
| WO | 2004/078671 | | 9/2004 |
| WO | 2006/085012 | | 8/2006 |
| WO | 2006085012 | | 8/2006 |
| WO | WO 2006/085012 | * | 8/2006 |
| WO | 2007/074330 | | 7/2007 |
| WO | 2007074330 | | 7/2007 |

OTHER PUBLICATIONS

J. L. White: 'Twin Screw Extrusion, technology and Principles', 1999, Carl Hanser Verlag.
Ica Manas-Zloczower, 'Mixing and Compounding of Polymers', 1994, Carl Hanser Verlag.
L Boukhelifa et al., "Evaluation of Cement Systems for Oil- and Gas-Well Zonal Isolation in a Full-Scale Annular Geometry", SPE 87195.

* cited by examiner

Primary Examiner — James J Seidleck
Assistant Examiner — Deve E Valdez
(74) Attorney, Agent, or Firm — Michael Dae

(57) ABSTRACT

Cement compositions comprising polymeric particles with inorganic fillers have utilities in the context of well cementing. The fillers improve bonding between the polymeric particles and the cement matrix leading to improved mechanical parameters of the cement system. The filled particles may also lead to improved mixability and slurries that are easier to optimise.

18 Claims, 2 Drawing Sheets

CEMENT COMPOSITIONS INCLUDING POLYMER PARTICLES

TECHNICAL FIELD

The invention relates to a composition suitable for applications in oil-well cementing, comprising polymeric particles with inorganic fillers. In particular, the composition is useful for flexible cement systems. The composition is included in the design of such systems to decrease the Young's modulus of a given system and to improve the resistance of the system to pressure and temperature changes in the well.

BACKGROUND ART

There are several problems associated with incorporating polymeric particles into a cement matrix. Firstly, polymer particles do not bind to a cement matrix, so although addition of these particles to the cement results in a lower Young's modulus, the tensile and compressive strengths of the system are also reduced. Secondly, polymer particles are typically low density, so when they are added to a cement system, in many cases weighting agents also need to be added to maintain the required density. It is sometimes difficult to stabilise systems that contain both lightweight polymeric particles and weighting agents. Thirdly, polymer particles are frequently hydrophobic and are thus sometimes difficult to mix during cement operations due to wettability and foaming issues.

A number of proposals have been made for using polymer particles in cements or other construction materials and oil-filed fluids. Examples include WO 06/085012, which describes the use of polymer particles coated with minerals for cementing applications (the minerals are present as anti-caking agents and are loosely attached at best to the surface of the polymer particles); U.S. Pat. No. 7,255,738, which discloses hydrophobic particles, coated with mineral fillers, used as lightweight roofing materials; WO07/074,330 which discloses a cement composition containing a particulate elastomer comprising a carboxy group, as well as methods of cementing and of enhancing the mechanical properties of a set cement composition and improved bonding; and WO04/07867 which discloses the addition of carboxylate monomers to acrylonitrile-butadiene elastomers to improve thermal stability. Ground car tyres (which themselves contain fillers such as carbon black and silica) have been also used in cement systems (U.S. Pat. No. 5,779,787 and U.S. Pat. No. 6,907,929). Deformable beads containing a solid core with a deformable outer layer have been disclosed for fracturing operations (U.S. Pat. No. 6,059,034). The use of lightweight polyamide particles for fracturing applications, with the option of having fillers to improve the properties, has also been described (US20070209795).

US20060258546 describes lightweight structured composites, containing particulates with tailored particle size distribution and a binder, and is in the field of proppants. The binder used is a phenol-formaldehyde or other thermoset resin. U.S. Pat. No. 6,406,789 and U.S. Pat. No. 6,632,527 describe a composite particle comprising filler particles distributed through a binder material. The main application is as a lightweight proppant. Methods to manufacture filled resin particles that could be used in cementing applications are also disclosed.

DISCLOSURE OF THE INVENTION

A first aspect of the invention comprises a cement composition comprising a blend of particulate materials including cement and at least one polymeric material, wherein the polymeric material has an inorganic filler dispersed therein.

Compositions according to this aspect of the invention have the advantage that the use of the inorganic filler in the polymeric particles makes the design of stable slurries much easier, because the filler can be used to control the density of the polymeric particles as well as their ability to interact with the cement matrix. Naturally occurring inorganic materials include silica, hematite, calcium carbonate, clays, natural zeolites, oxides of manganese, barite, ilmenite. Synthetic or treated inorganic materials include Portland cement, cluminate cement, blast furnace slag, fly ash, cenospheres, synthetic zeolites, calcined clays, precipitated silica, cement kiln dust, glass beads/bubbles and combinations thereof.

The particulate materials preferably fall into at least two substantially non-overlapping particle size bands. It is particularly preferred that the cement and polymeric material fall in different size bands. The polymeric material can have a particle size in the range 100-1000 microns, and the composition can comprise at least one further particulate material having a particle size in the range 100-1000 microns, and/or at least one further particulate material having a particle size of less than 10 microns.

The polymeric material preferably comprises a thermoplastic polymer such as polypropylene.

The inorganic filler typically has an affinity for the matrix of the cement when set, and can comprise silica, hematite and/or cement particles.

The particles of polymeric material and the inorganic filler may have a density higher than that of corresponding polymeric material with no filler, for example greater than 1 g $cm^{-3}$.

The inorganic filler optionally comprises a particulate material that has been surface treated prior to blending with the polymeric material so as to improve bonding to and/or dispersion in the polymeric matrix but without affecting its bonding with the cement matrix.

The polymeric material is typically present in the amount of 20-55% by volume of blend.

A second aspect of the invention comprises a polymeric material for use in a cement composition, comprising particles of a polymer matrix having inorganic filler dispersed therein.

A third aspect of the invention comprises a method of making a polymeric material according to the second aspect of the invention, comprising mixing the inorganic filler in the polymer while it is in a fluid form, and allowing the polymer to solidify with the filler dispersed therein.

In one embodiment, the solidified polymer is ground to form the particles.

The inorganic filler and polymer can be blended using batch processing, continuous stirred tank reactors or extrusion.

MODE(S) FOR CARRYING OUT THE INVENTION

Figure 1:
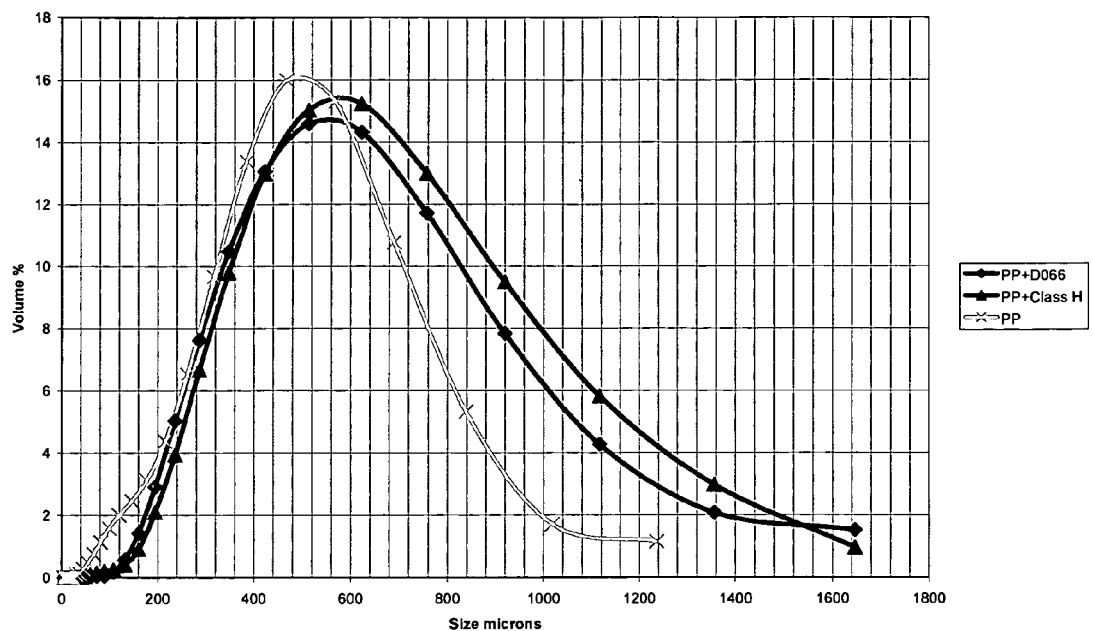
FIG. 1 shows a plot of particle size distribution for various particles useful in the present invention.

The invention relates to cement compositions typically comprising a mixture of a blend of materials including cement, polymer with the inorganic filler, other additives (such as solid retarders, dispersants, silica additives for strength retrogression etc and optionally weighting agents, wherein the polymer and additive are in particle form and the additive is both a filler of the polymer and an inorganic material. The inorganic filler improves bonding between the polymer particles and the cement matrix, improving the mechanical parameters of the set cement. The filler may also provide improved handling properties to the polymer particles (e.g. decrease the hydrophobicity of the particles and thus improve wettability and decrease foaming tendency). In addition the polymeric particles can be filled with a weighting agent to improve slurry stability and simplify design.

The selection of the polymeric material depends on the application. The preferred polymeric materials are thermoplastic materials but thermoset materials may also be useful in some applications. The polymeric material should not react significantly with the cement slurry during placement or with the set cement matrix and in most cases the polymeric material should be used at temperatures below its melting (crystalline polymers) or glass transition temperature (amorphous polymers). However, it is noted that filling thermoplastics can increase their heat deflection temperature and thus potentially their maximum use temperature in wellbore applications. The polymeric material should also be compatible, i.e. must not lose a significant proportion of its properties, with the fluids in which it will be in contact.

The filling materials should be materials that will have an affinity for the cement matrix but not adversely affect the polymeric material. The fillers should be of an appropriate size to allow processing with the polymer. The final product is preferably of a size that can be blended, mixed and pumped with conventional equipment i.e. typically <1 mm.

Blending of the inorganic filler and the polymeric matrix material can be performed by any known technique. For thermoplastic materials extrusion is a preferred method, although batch processing, for example using a Banbury mixer, or continuous stirred tank reactors may also be used. A wide range of extruders are presently available (see J. L. White, "Twin Screw Extrusion, technology and Principles," Carl Hanser Verlag, 1999), most of which can be used to blend a filler with a polymer.

In one method the polymeric material and filler are blended together and then fed to a co-rotating intermeshing twin screw extruder to melt process the polymer and filler together. In another method the filler is added to the molten polymer. In yet another method the filler is added to a feed stock, e.g. caprolactam, which subsequently undergoes a reactive extrusion (polymerisation of the caprolactam) to form filled nylon-6.

Various other processing methods are described in "Mixing and Compounding of Polymers," I. Manas-Zloczower and Z. Tadmor eds. Carl Hanser Verlag 1994, including the Banbury mixer. The blending conditions (e.g. temperature, extruder screw design, and rotor speed) can be adjusted to produce the appropriate dispersion of the inorganic material within the polymer matrix.

The inorganic filler can be surface treated prior to compounding with the polymer to improve bonding to, and dispersion within, the polymer matrix provided that the treatment does not affect the final properties of the material.

Once formed the composite materials can then be ground or formed into appropriate sized materials.

Example 1

Preparation and Characterisation of Composite Polymer Particles

Figure 2:
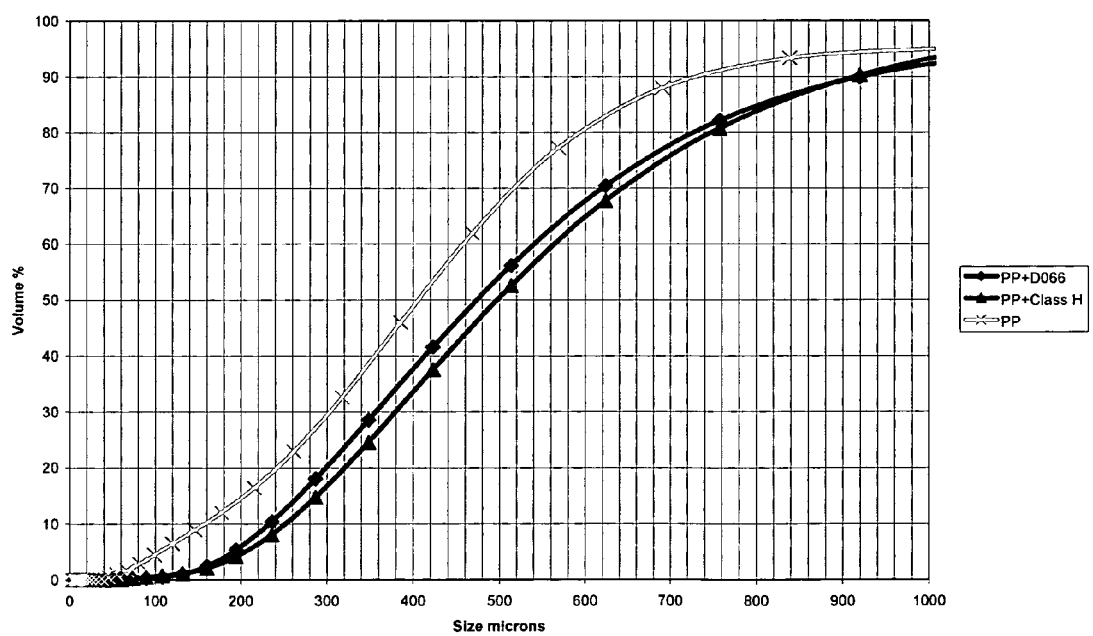
FIG. 2 shows a plot of cumulative particle size for the particles plotted in FIG. 1.

FIGS. 1 and 2 show the particle size distribution of pure polypropylene (PP) particles that do not contain any inorganic filler polymer particles, compared with filled polypropylene particles resulting from the dry blending, feeding into a twin-screw extruder for mixing and melt processing, then subsequent cryo-grinding, of polypropylene pellets with the inorganic additives and fillers silica flour (D066 from Schlumberger) (PP+D066) and Class H cement (PP+Class H). The fillers are added at a nominal concentration of 20% by weight of polymer. The density of the base materials and the final processed particles are determined using a helium pycnometer, thus allowing the final composition of the materials to be determined.

The particle size distribution of all the aforementioned particles is measured using a Malvern laser particle size analyser, and the figures show that the particle size of the filled polymer particles is comparable with the particle size of pure polypropylene particles that do not contain any inorganic filler.

Example 2

Effect of Filled Particles on Mechanical Parameters of the Set Cement

Table 1 shows the densities of pure polypropylene particles, pure silica flour particles and pure Class H cement compared to the densities of the polypropylene/silica flour composite and the polypropylene/class H composite. The calculated % mass and % volume of the fillers in the two composites are also shown.

TABLE 1

|  | Density ($g\,cm^{-3}$) | Filler (% mass composite) | Filler (% volume composite) |
| --- | --- | --- | --- |
| Polypropylene (PP) | 0.9 | — | — |
| Silica flour | 2.65 | — | — |
| Class H cement | 3.210 | — | — |
| Polypropylene/silica flour composite | 1.008 | 15.5 | 5.9 |
| Polypropylene/class H composite | 1.090 | 23.6 | 8.0 |

Table 2 shows some properties of three designed cement systems, comprising polypropylene with inorganic filler (silica or Class H cement), compared with the base design containing 30% by volume of blend (BVOB) polypropylene particles (PP).

TABLE 2

|  | PP | PP-silica 1 | PP-silica 2 | PP-class H |
| --- | --- | --- | --- | --- |
| Class G (% BVOB) | 31.5 | 31.1 | 31.1 | 31.3 |
| PP (% BVOB) | 30 | — | — | — |
| PP-silica (% BVOB) | — | 30.9 | 33.9 | — |
| PP-class H (% BVOB) | — | — | — | 30.5 |
| Large silica (% BVOB) | 25 | 24.7 | 21.7 | 24.8 |
| Fine silica (% BVOB) | 13.5 | 13.3 | 13.3 | 13.4 |
| SVF (%) | 59 | 59.3 | 59.3 | 59.2 |
| Density ($kg\,m^{-3}$) | 1770 | 1780 | 1750 | 1795 |

The designs PP-silica 1 and PP-class H in Table 2 comprise slightly higher volumes of flexible polypropylene particle than the base design PP, but the slurry density is higher because the flexible polypropylene particle contains inorganic filler.

Although the content of the composite particle in the PP-silica 1 and PP-class H designs is higher than that of the PP particle in the base design, the volume of the PP component is lower in designs PP-silica 1 and PP-class H than in the base design.

The design PP-silica 2 has a slightly lower density than the base design. The concentration of the filled particle has been increased and the concentration of the large silica decreased to compensate for the silica in the filled particle. The design PP-silica 2 contains a slightly higher concentration of PP but lower concentrations of silica and cement, compared with the base system.

Table 3 shows the mechanical parameters of three designed cement systems, comprising polypropylene with inorganic filler (silica or Class H cement), compared with the base design containing 30% by volume of blend (BVOB) polypropylene particles (PP).

TABLE 3

|  | PP | PP-silica 1 | PP-silica 2 | PP-class H |
|---|---|---|---|---|
| UCS (MPa) | 11.7 | 17.1 ± 0.6 | 14.6 ± 0.5 | 17.2 ± 0.3 |
| Young's modulus (MPa) | 3700 ± 500 | 4100 ± 300 | 3400 ± 600 | 4050 ± 300 |
| Poisson's ratio | 0.14 ± 0.02 | 0.15 ± 0.01 | 0.14 ± 0.02 | 0.17 ± 0.01 |
| Number of samples | 2 | 6 | 4 | 3 |
| UCS limit for cycles (MPa) | 7.5 | 8.5 | 6 | 8.5 |
| Tensile strength (MPa) | 3.1 ± 0.2 | — | — | — |

Figure 3:
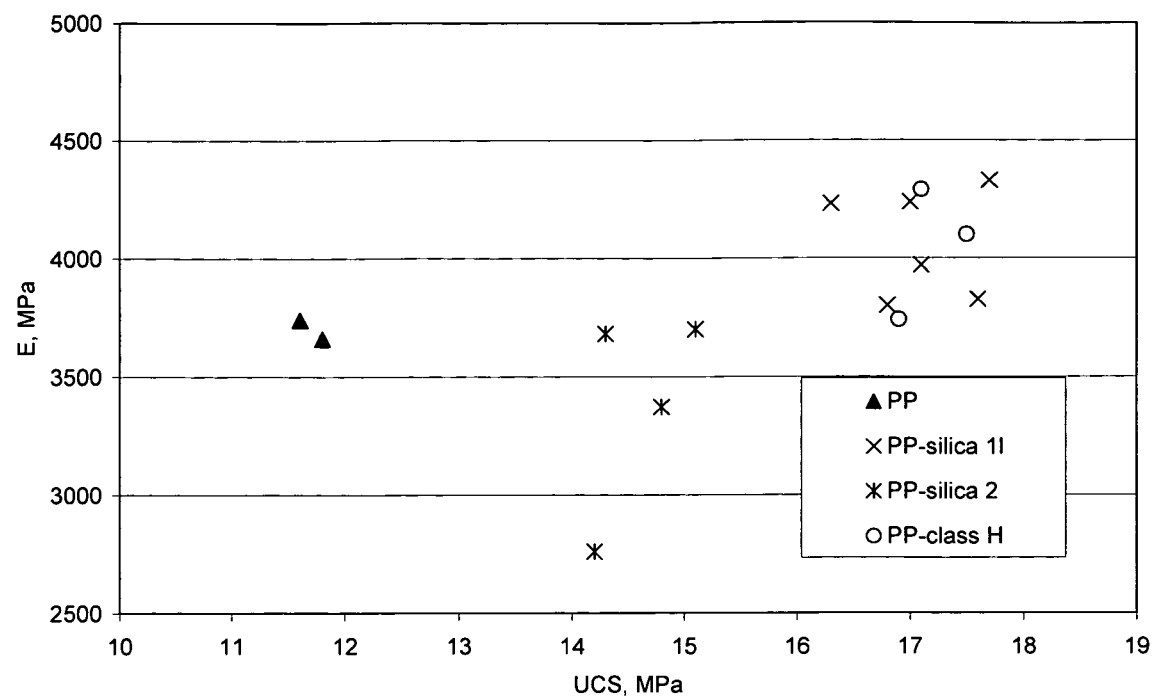
FIG. 3 shows a plot of compressive strength vs. Young's modulus for various compositions according to the invention.

Prior to coring and cutting for mechanical property measurements, the four systems are optimised to ensure there is no sedimentation or separation and then cured for 1 week at 100° C. and 20.7 MPa pressure. The results show that at almost constant composition (design PP and PP-silica 2) addition of the filler in the polymer particle has significantly increased the compressive strength of the system without affecting the Young's modulus. The designs PP-silica 1 and PP-class H cement have slightly higher Young's moduli than the base (PP) system but the compressive strengths are significantly (>50%) higher (FIG. 3). Thus filled particles will provide cement systems that resist larger temperature and pressure changes in a wellbore than non-filled particles.

Example 3

Designs with Weighting Agents Incorporated in the Polymeric Material

A second polypropylene/silica composite particle was manufactured with a much higher concentration of silica. The density of the particle, as measured with a helium pycnometer is shown in Table 4.

TABLE 4

|  | Density (g cm$^{-3}$) | Filler (% mass composite) | Filler (% volume composite) |
|---|---|---|---|
| Polypropylene (PP) | 0.9 | — | — |
| Silica flour | 2.65 | — | — |
| Polypropylene/silica flour composite 2 | 1.5159 | 61 | 35 |

Table 4-5 shows the properties of the blend design of a system comprising the polypropylene/silica (PP-silica 2) particle compared with a conventional design (polypropylene and silica particles added separately). The composite particle allows a system to be designed at a density of 1680 kg m$^{-3}$ using only one large particle, rather than the two large particles required with a conventional design (see EP0621247 for a discussion of the use of particles falling in different, discrete size bands).

TABLE 5

|  | Conventional Large silica | New PP-silica |
|---|---|---|
| SVF (%) | 57 | 57 |
| Density (kg m$^{-3}$) | 1680 | 1680 |
| Class G (% BVOB) | 31.5 | 31.5 |
| Fine silica (% BVOB) | 13.5 | 13.5 |
| PP (% BVOB) | 36 | — |
| Large silica (% BVOB) | 19 | — |
| PP-silica 2 (% BVOB) | — | 55 |
| Estimated mechanical parameters |  |  |
| Young's modulus (MPa) | 3900 | 3900 |
| UCS (MPa) | 23 | 23 |

It is possible to include up to about 35% by volume of filler into polypropylene particles prior to grinding as shown in Table 4.

When compared with conventional designs containing polypropylene particles alone or silica particles alone, a design with polypropylene particles filled with silica may be much easier to stabilise, because the resulting slurry contains large particles with a density of 1515 kg m$^{-3}$. With the conventional design containing polypropylene particles and silica particles separately, the slurry may be much more difficult to stabilise because the slurry will contain both polypropylene particles with a density of 900 kg m$^{-3}$, and silica particles with a density of 2650 kg m$^{-3}$.

If hematite (density 4950 kg m$^{-3}$) is used as a filler at a concentration of 35% by volume, the resulting filled polypropylene particle will have a density of 2300 kg m$^{-3}$. If the PP-silica 2 particle is replaced by a PP-hematite particle (with the same filled concentration) in the new design of Table 2 the system density would be 1970 kg m$^{-3}$.

The invention claimed is:

1. A cement composition comprising a blend of particulate materials, the particulate materials comprising cement particles and polymer particles, the polymer particles comprising at least one polymeric material and an inorganic filler dispersed within each polymer particle.

2. The composition as claimed in claim 1, wherein the particulate materials fall into at least two different particle size bands.

3. The composition as claimed in claim 2, wherein the cement particles and the polymer particles fall into different particle-size bands.

4. The composition as claimed in claim 3, wherein the polymer articles have a particle size range in the range 100-1000 microns.

5. The composition as claimed in claim 4, further comprising at least one further particulate material having a particle size in the range 100-1000 microns, and/or at least one further particulate material having a particle size of less than 10 microns.

6. composition as in claim 1, wherein the polymeric material comprises a thermoplastic polymer.

7. The composition as claimed in claim 6, wherein the polymeric material comprises polypropylene, polyethylene, polyamide, polyesters, polystyrene, polyetheretherketone, polyethersulfone, polyphenylene sulphide, perfluoroalkoxy, thermoplastic-elastomers or polyethylene terephthalate.

8. The composition as in claim 1, wherein the inorganic filler has an affinity for the matrix of the cement when set.

9. The composition as in claim 8, wherein the filler comprises silica, hematite and/or cement particles.

10. The composition as in claim 1, wherein the particles of polymeric material and inorganic filler have a density higher than that of corresponding polymeric material with no filler.

11. The composition as claimed in claim 10, wherein the density of the particles of polymeric material and inorganic filler is greater than 1 g cm$^{-3}$.

12. The composition as in claim 1, wherein the inorganic filler comprises a particulate material that has been surface treated prior to blending with the polymeric material so as to improve bonding to, or dispersion in the polymeric matrix or both.

13. The composition as in claim 1, wherein the polymeric material is present in the amount of 20-55% by volume of blend.

14. A polymeric material for use in a cement composition, comprising particles of a polymer matrix having inorganic filler dispersed within, the particles having a particle-size between 100 and 1000 microns, and the filler comprising silica, hematite and/or cement particles.

15. A method of making a polymeric material for use in a cement composition, the material comprising particles of a polymer matrix having inorganic filler dispersed within, comprising mixing the inorganic filler in the polymer while the polymer is in fluid form, allowing the polymer to solidify with the filler dispersed therein and grinding the solidified polymer to form the particles, the particles having a particle size between 100 and 1000 microns.

16. The method as in claim 15, wherein the inorganic filler and polymer are blended using batch processing, continuous stirred tank reactors or extrusion.

17. The method of claim 15, wherein the polymeric material comprises a thermoplastic polymer.

18. The method of claim 15, wherein the filler comprises silica, hematite and/or cement particles.

* * * * *